United States Patent
Hettinga

[11] Patent Number: 6,139,934
[45] Date of Patent: Oct. 31, 2000

[54] BOTTLE CLOSURE

[76] Inventor: Siebolt Hettinga, 2123 NW. 111th St., Des Moines, Iowa 50325-3788

[21] Appl. No.: 09/042,341

[22] Filed: Mar. 13, 1998

[51] Int. Cl.[7] ........................................ B32B 7/02
[52] U.S. Cl. ..................... 428/66.3; 428/66.4; 428/218; 428/316.6
[58] Field of Search ................ 428/66.3, 66.4, 428/218, 316.6

[56] References Cited

U.S. PATENT DOCUMENTS

| | | |
|---|---|---|
| 3,250,417 | 5/1966 | Powers, Jr. et al. . |
| 3,922,429 | 11/1975 | Welch et al. ............... 428/316.6 |
| 4,008,820 | 2/1977 | Ruetz . |
| 4,089,434 | 5/1978 | Tagalakis et al. ............ 428/66.4 |
| 4,188,457 | 2/1980 | Throp . |
| 4,363,849 | 12/1982 | Paisley et al. . |
| 4,583,654 | 4/1986 | Pufpaff et al. . |
| 4,879,138 | 11/1989 | Johnson et al. ............. 428/316.6 |
| 5,480,915 | 1/1996 | Burns . |
| 5,496,862 | 3/1996 | Burns . |
| 5,601,200 | 2/1997 | Finkelstein et al. ........... 428/66.4 |
| 5,649,637 | 7/1997 | Weiler . |
| 5,692,629 | 12/1997 | Burns . |
| 5,904,965 | 5/1999 | Noel et al. ................ 428/66.4 |

*Primary Examiner*—Allan R. Kuhns
*Attorney, Agent, or Firm*—Brian J. Laurenzo; Michael C. Gilchrist

[57] ABSTRACT

An injection molded bottle closure with a gradually varying cellular density distribution, whereby the cellular density distribution varies between a first cellular structure of a high density and a second cellular structure of a relatively lower density. The method of forming the injection molded bottle closure comprises forming a mold cavity be engaging a first mold section with a second mold section having a retractable portion, and injecting into the mold cavity an injection mixture which contains a blowing agent. A gradually varying density distribution is created according to a predetermined control function which depends on the mold cavity volume and the injection rate of the injection mixture.

20 Claims, 6 Drawing Sheets

BOTTLE CLOSURE

BACKGROUND OF THE INVENTION

This invention relates to bottle closures for sealing bottles, and more particularly, to an injection molded bottle closure comprised of a first cellular structure of high density, a second cellular structure of relatively lower density, and a transitional cellular structure between the first and second cellular structures which provides for a gradual variation in cellular density.

Traditionally cork comprises the most common material for bottle closures. However, continued increases in demand for cork increase the cost of cork, and place a strain on the diminishing supply of cork producing trees. Further, variations in the color, compressibility, and rigidity of cork renders a substantial amount of cork unusable. Hence, there exists a need for a suitable alternative to natural cork bottle closures.

Synthetically generated bottle closures are well known in the art, some even utilize thermoplastic resins and blowing agents to create a dense outer skin and a low density interior. U.S. Pat. No. 5,692,629 disclose such a product. These type of bottle closures, however, suffer from several drawbacks. Synthetic bottle closures typically have rough outer surfaces. These surfaces prevent the bottle closure from forming a strong uniform seal of the bottle. A deficient seal allows for leakage of the contents of the bottle, and provides an opportunity for contaminates to enter the bottle. Additionally, the rough appearance renders the bottle closure less aesthetically pleasing. The rough appearance generally results from imperfections in the cellular structure of the bottle closure. Opens and fissures created during the injection molding process provide areas where contaminants can collect, and provide an environment for the growth of bacteria.

Furthermore, a bottle closure must ensure a hermetic airtight seal and provide for the removal of the bottle closure, and in some cases re-closure of the bottle. Thus, a bottle closure requires a degree of compressibility and a memory to allow the bottle closure to return to its original size. Cork, despite its other drawbacks, naturally possesses this quality. Synthetic bottle closures, even those that utilize blowing agents, lack compressibility and a memory for decompressibility. In other words, synthetic bottle closures lack the look and feel of cork. Accordingly, there exists a need for an injection molded bottle closure that can provide a hermetic airtight seal and at the same time maintain the look and feel of natural cork.

SUMMARY OF THE INVENTION

An object of the present invention comprises providing an injection molded bottle closure with the compressibility of natural cork.

Another object of the present invention comprises providing an injection molded bottle closure with a memory for return to its original size and shape after experiencing compression.

An object of the present invention comprises providing an injection molded bottle closure capable forming a strong uniform seal with the neck of a bottle.

An object of the present invention comprises providing an injection molded bottle closure capable of removal from, and re-closure with, the neck of the bottle.

An object of the present invention comprises providing an injection molded bottle closure that prevents the contamination of the contents of the bottle.

These and other objects of the present invention will become apparent to those of ordinary skill in the art upon reference to the following specification, drawings, and claims.

The present invention proposes to overcome the difficulties encountered heretofore. To this end, a bottle closure is molded according to an injection molding process that utilizes a first mold section and a second mold section capable of moving relative to each other. An injection mixture containing a blowing agent is injected into a mold cavity formed between the first and second mold sections. A cellular density distribution is formed by varying the injection rate and the volume of the mold cavity according to a predetermined control function. The cellular density distribution varies gradually between a high density exterior and a low density interior.

DETAILED DESCRIPTION OF THE INVENTION

Figure 1:
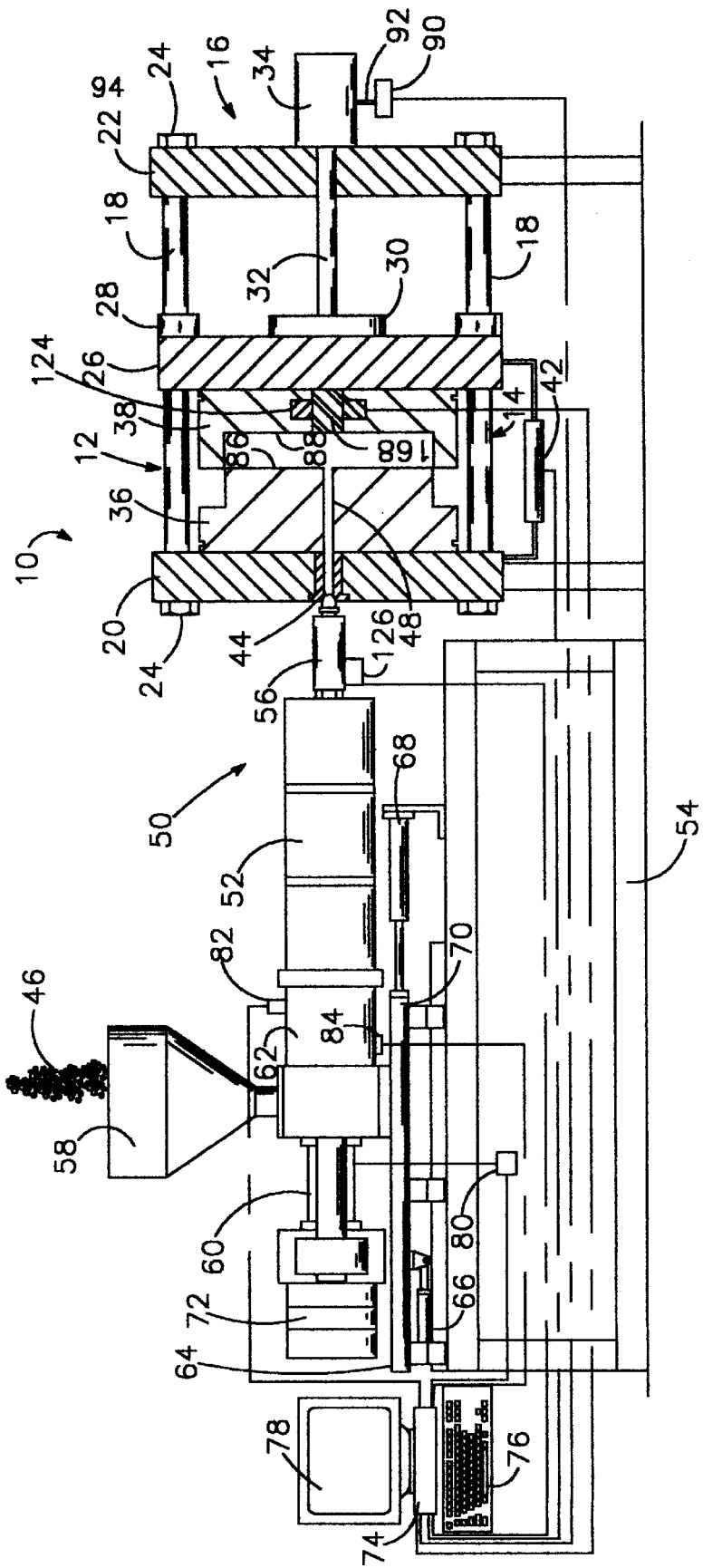
FIG. 1 is a side elevation view of an injection molding machine.

Referring to the drawings, a mold apparatus 10 is shown including a mold unit 12, a mold frame 14, and a hydraulic piston 16 (FIG. 1). The mold frame 14 consists of four cylindrical support bars 18 which are secured to a first plate 20 and to a second plate 22 by means of nuts 24. A mold carriage 26 is slideably attached to the support bars 18 through bores which pass through the corners of the mold carriage 26. Support blocks 28 are provided with bores and mounted to the corners of the mold carriage 26 to add extra support to the mold carriage 26 as it slides along the support bars 18. A platen 30 is secured to the mold carriage 26 to evenly distribute force over the mold carriage 26. Secured to the platen 30 is a piston ram 32. The piston ram 32 passes through a bore in the center of the second plate 22 and is connected to a hydraulic cylinder 34. The hydraulic cylinder 34, piston ram 32, traverse valve 92, and variable vane hydraulic pump 90 make up the hydraulic piston 16. The hydraulic piston 16 is in connection with a central processing unit 74, and can be controlled through the central processing unit 74.

Figure 3:
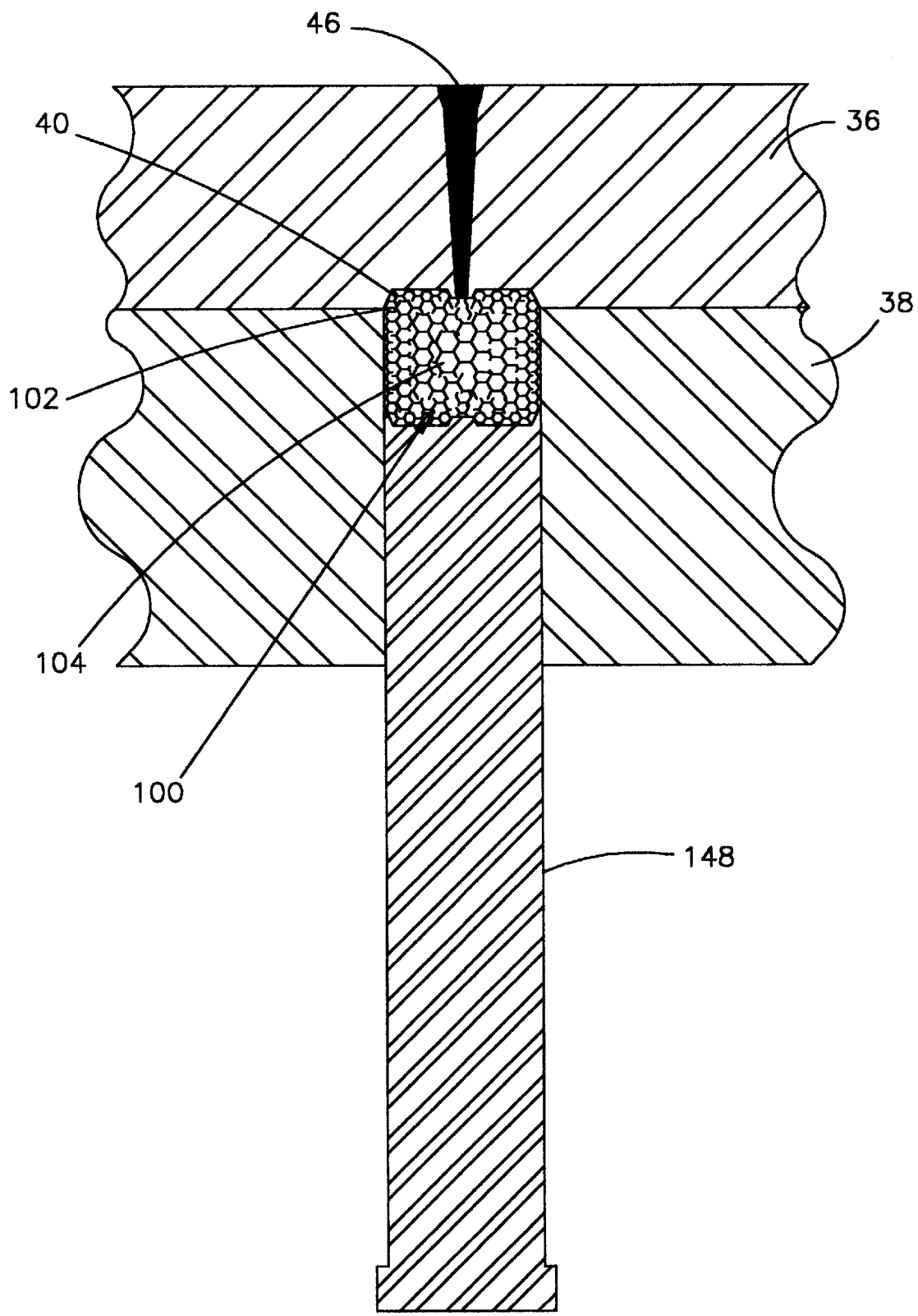
FIG. 3 is a cross-sectional view of the mold unit of the injection molding machine of FIG. 1 during a second molding period
Figure 4:
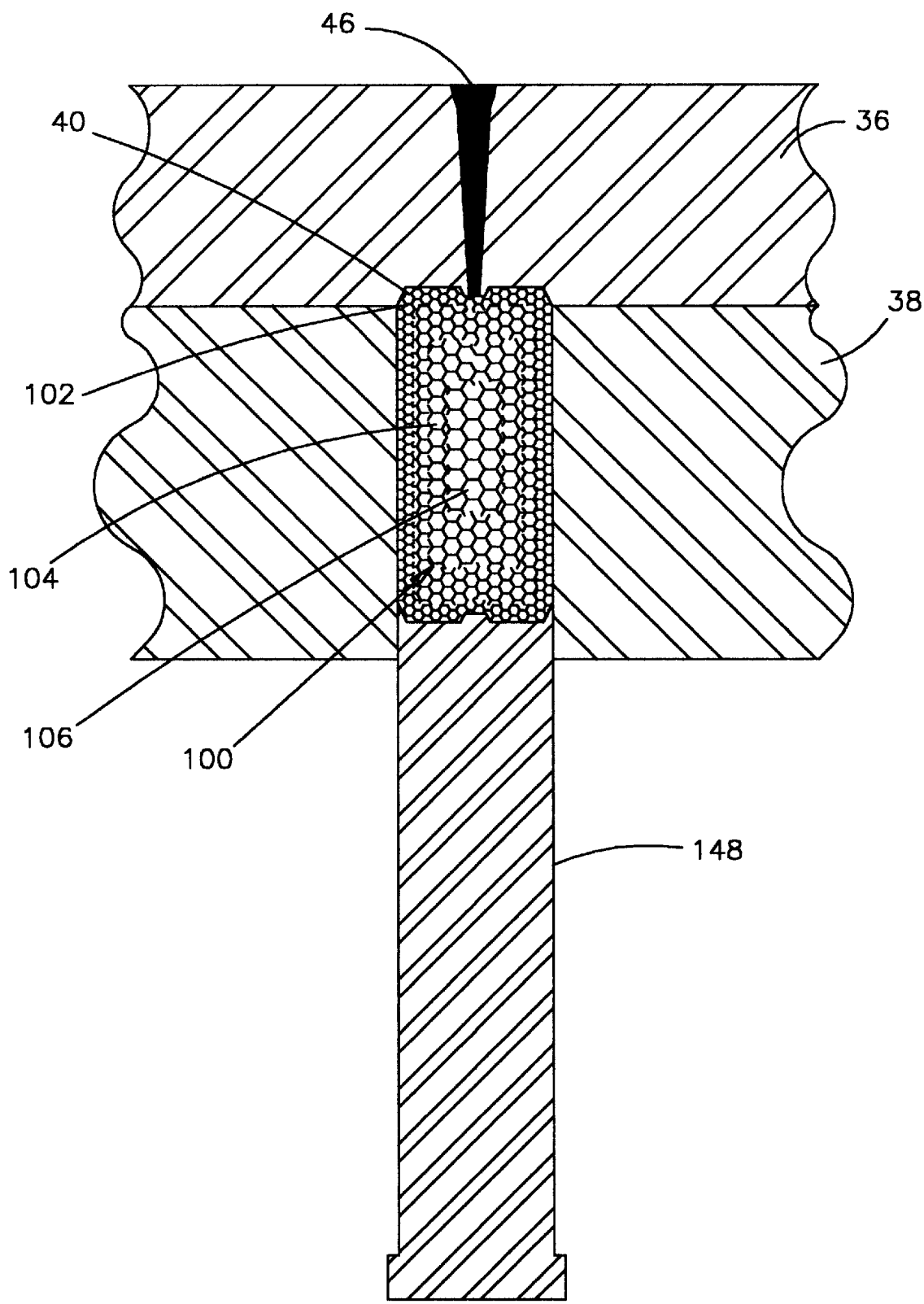
FIG. 4 is a cross-sectional view of the mold unit of the injection molding machine of FIG. 1 during a third molding period
Figure 5:
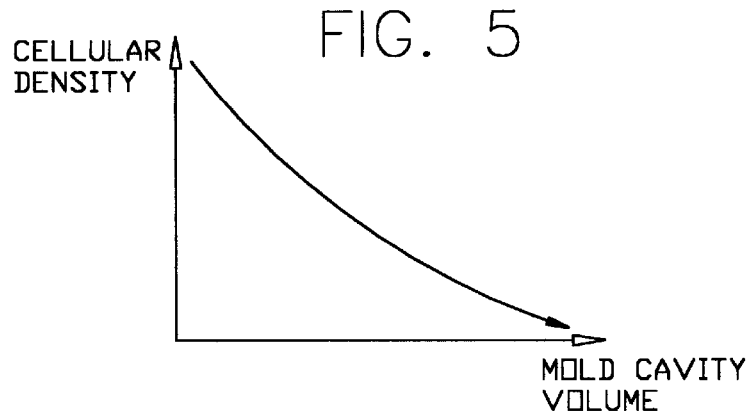
FIG. 5 is a graphical representation of the relationship between the cellular density and the mold cavity volume.

A first mold section 36 is mounted to the first plate 20 in alignment with a second mold section 38 which is mounted to the mold carriage 26. As the hydraulic piston 16 pushes the mold carriage 26 toward the first plate 20, the first mold section 36 fits into seated engagement with the second mold section 38 to form a mold cavity 40 therebetween. The second mold section 38 has retractable mold portion 168, which moves relative to the rest of the second mold section 38. The retractable mold portion 168 can be moved hydraulically, pneumatically, electrically, servo-electrically, or by any other suitable or equivalent means. Additionally, the mold unit 12 can be configured such that the first mold section 36 has the retractable mold portion 168. As shown in FIGS. 3–5 the volume of the mold cavity 40 may be increased or decreased by moving the retractable mold portion 168 of the second mold section 38 away from or toward the first mold section 36. Additionally, the volume of the mold cavity 40 may be increased or decreased by moving the second mold section 38 away from or toward the first mold section 36.

A linear actuator 42 is mounted between both the first plate 20 and mold carriage 26 to monitor the distance between these two items to allow calculation of the volume of the mold cavity 40 when the second mold section 38 is placed at various distances relative to the first mold section 36. The linear actuator 42 is in connection with the central processing unit 74 in order to give feedback to the central processing unit 74 as to the position of the first mold section 36 relative to the second mold section 38. It is contemplated that the linear actuator 42 could be located between the second plate 22 and the mold carriage 26, or between any two points that would give feed back as to the position of the first mold section 36 relative to the second mold section 38. A nozzle inlet 44 is located in the center of the first plate 20 to allow an injection mixture 46 to pass into a mold inlet 48 located in the first mold section 36 and thereafter into the mold cavity 40.

Figure 2:
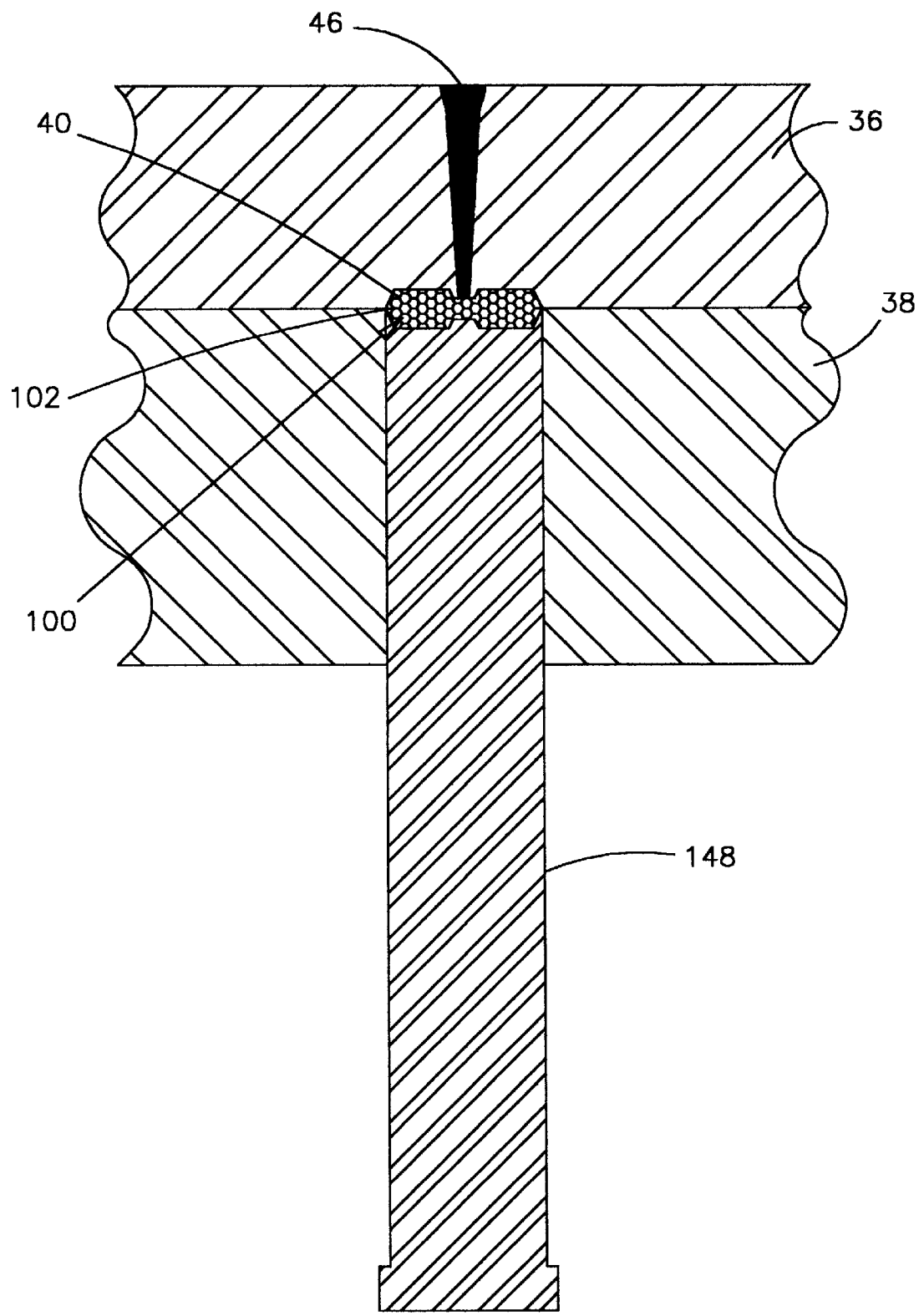
FIG. 2 is a cross-sectional view of the mold unit of the injection molding machine of FIG. 1 during a first molding period

Provided for operable engagement with the nozzle inlet 44 is an injection assembly 50 which prepares and injects the injection mixture 46 into the mold cavity 40 (FIG. 1, FIG. 2). The injection assembly 50 is provided with an injection barrel 52 supported by a main frame 54. A nozzle unit 56 is mounted at one end of the injection barrel 52 and a hopper 58 is mounted to the top of the injection barrel 52. Positioned coaxially within the injection barrel 52 is a reciprocating screw 60 with attached flights (not shown) for plasticizing and moving the injection mixture 46 toward the injection barrel 52 and nozzle unit 56. A variable volume, pressure compensated hydraulic pump 62 is secured to the injection barrel 52 and operates to move the injection screw 60 relative to the injection barrel 52 during the injection molding process. The injection assembly 50 is provided with a large rotational motor 72 which turns the injection screw 60 to plasticize the injection mixture 46 before injection.

The nozzle unit 56 is movable into and out of operative association with the nozzle inlet 44 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a second linear actuator 68 mounted on the mainframe 54 for coacting engagement with a limit member 70 on the carriage 64.

The injection assembly 50 is operably coupled to the central processing unit 74 which monitors the progress of the injection process and feeds back responsive information regarding this progress to the injection assembly 50 (FIG. 1). In a preferred embodiment the central processing unit 74 is a personal computer, but the central processing unit 74 may, of course, be any system capable of receiving user input variables, monitoring the progress of a plastic injection run, and controlling the injection in response thereto. The central processing unit 74 is equipped with an input device 76 and a viewing screen 78. To monitor the rate of injection mixture 46, a shot size transducer 80 is coupled to the injection screw 60 to monitor the distance that the injection screw 60 travels. The shot size transducer 80 is a linear actuator which correlates movement of the injection screw 60 to a predetermined amount of the injection mixture 46 injected into the mold cavity 40. The shot size transducer is connected to the central processing unit 74 in order to give feedback to the central processing unit 74. As each incremental amount of the injection mixture 46 within the injection assembly 50 is injected into the mold cavity 40, the shot size transducer 80 monitors the associated incremental movement of the injection screw 60. Preferably the shot size transducer 80 measures increments of injection mixture 46 of one gram or less, which translates into approximately four thousand increments for a typical molding operation.

To monitor the pressure at which the injection mixture 46 is injected into the mold cavity 40, a pressure monitor 82 is operably coupled to the hydraulic pump 62 (FIG. 1). The pressure monitor 82 is also coupled to the central processing unit 74. The central processing unit 74 is operably coupled to an injection control 84 which is, in turn, coupled to the hydraulic pump 62 to manipulate the injection of the injection mixture 46.

At the beginning of the molding process the hydraulic piston 16 is actuated to force the piston ram 32 toward the first plate 20. The platen 30 disburses the force of the piston ram 32 to the mold carriage 26 and the second mold section 38. The second mold section 38 is moved toward the first mold section 36 until a mold cavity 40 of an initial volume is formed. In the preferred embodiment of the present invention, this initial volume of the mold cavity 40 is the volume formed when the second mold section 38, and the retractable mold portion 168 of the second mold section 38, have been moved as far as possible toward the first mold section 36 (FIG. 2). It should be noted, however, that an infinite number of initial volumes for mold cavity 40 may be chosen, including the case where the mold cavity 40 has no volume until the injection mixture 46 pushes the second mold section 38, or the retractable mold portion 168, away from the first mold section 36.

The injection mixture 46 includes a blowing agent mixed with a plastic injection material. Although several blowing agents are known in the art, in the preferred embodiment the blowing agent is azodicarbonamide. Azodicarbonamide decomposes when heated to produce a gas. The ratio of the blowing agent to the plastic injection material is determined by process parameters, part or design, or desired application for the plastic part. In the preferred embodiment of the present invention azodicarbonamide is added to ethylene vinylacetate (EVA) at the approximate ratio of one part azodicarbonamide to ninety-nine parts EVA to produce the injection mixture 46. The injection mixture 46 is heated to an injection temperature and injected into the molding cavity 40. The injection temperature is hot enough to plasticize the injection mixture 46, and hot enough that the blowing agent will decompose, or be activated, unless the injection mixture 46 is pressurized. In the preferred embodiment the injection temperature is approximately 400 degrees Fahrenheit.

Before the injection mixture 46 is injected into the mold cavity 40, it is first plasticized to provide a flowable material which eventually hardens into a finished plastic article 148

Figure 9:
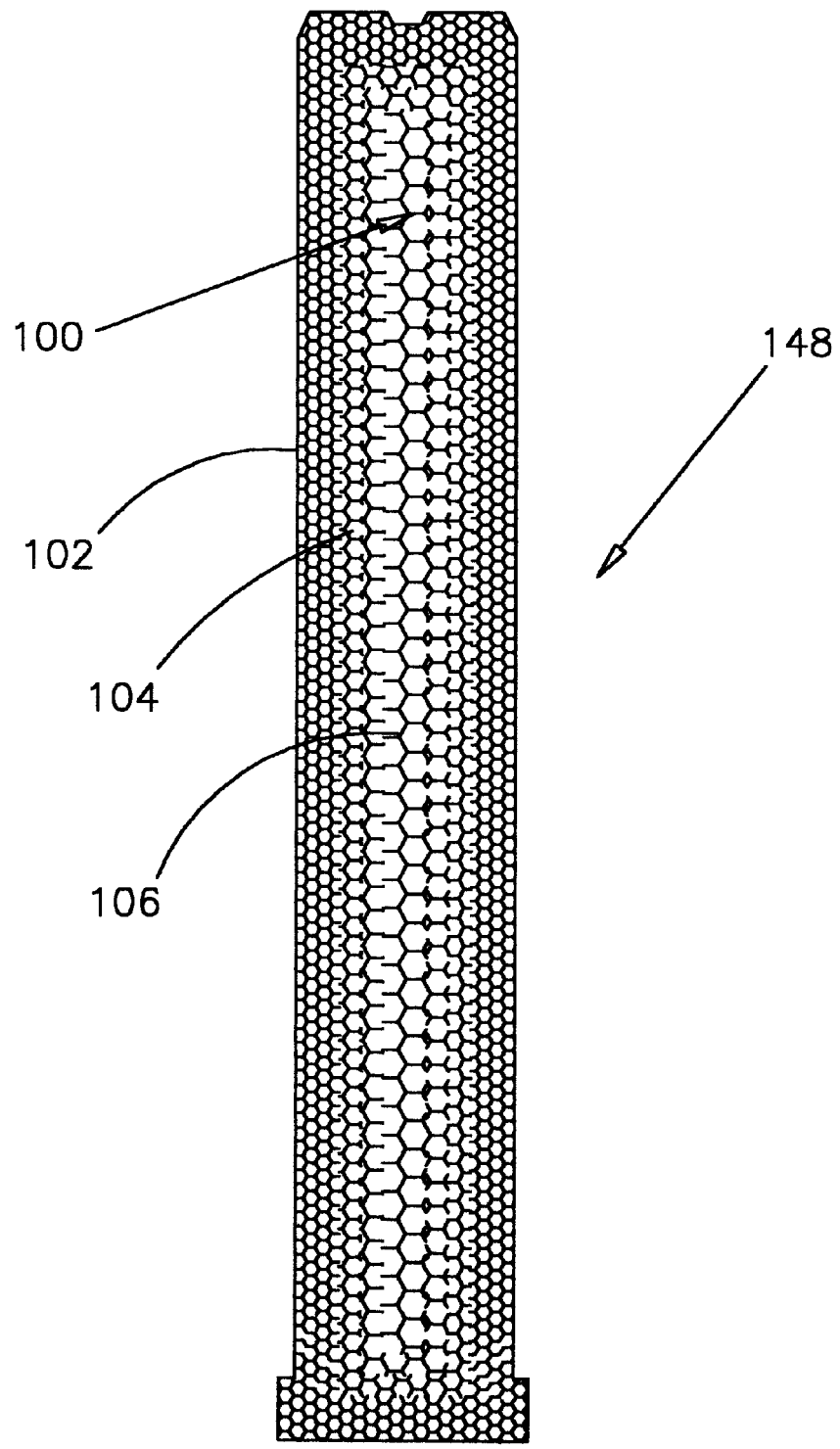
FIG. 9 is a cross-sectional view of a bottle closure.

(FIG. 9). The following parameters affect the plasticization process: the type of raw plastic material to be plasticized, throat temperature, the temperature of injection assembly heating zones, the size, length and type of screw 60, the rate at which the screw 60 is turned, and the rate at which the screw 60 is allowed to move back. Of these parameters, only the type of raw plastic material and screw dimensions are not directly controlled by a computer control program within the central processing unit 74. The computer control program controls the operation of the central processing unit 74, and therefore generally controls the injection molding apparatus and process. The throat temperature and temperature of injection assembly heating zones are controlled by standard proportion integral derivative (PID) control algorithms. The computer control program controls the rate at which the screw 60 is turned so that the rate is directly proportional to the rate of oil produced by a variable vane hydraulic pump. The computer control program directly controls the rate at which the oil is delivered by the hydraulic pump 62 by supplying two set points, a rate set point and a maximum pressure set point. The rate set point specifies the rate of oil flow requested, while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw 60 turns during the plasticization process is profiled. Profiling causes the screw 60 to turn at different rates during the plasticization cycle.

The rate at which the screw 60 is allowed to move back is also controlled by the computer control program. The profiled turning of the screw 60 during the plasticization process causes the injection mixture 46 to be metered to an area in front of the screw 60. The injection mixture 46 being metered forward causes a counter plastic pressure attempting to force the screw 60 backward. The rate at which the screw 60 moves backward, from the counter pressure of the injection mixture 46 being metered forward, is profiled by the computer control program. Profiling of the rate of movement backward allows for variations in the amount of time the injection mixture 46 is mixed by the screw 60, as well as profiling the amount of frictional heat created by the screw 60 turning which is induced into the injection mixture 46. The computer control program specifies this profile by supplying a back pressure set point to a variable hydraulic back pressure valve.

Like the plasticization process, the injection process is also controlled by the computer control program. The parameters associated with the injection process include the following: the type of raw injection mixture 46 to be injected; the temperature of the injection mixture 46; the size, length and type of screw 60; the rate at which the injection mixture 46 is injected; the mold design; and the mold temperature. Preferably, both the temperature of the injection mixture 46 and the rate at which the injection mixture 46 is injected are controlled by the computer control program.

A critical parameter in the injection process comprises the activation rate of the blowing agent in the injection mixture 46. The activation rate is controlled by the following interrelated parameters, the temperature of the injection mixture 46, the temperature of the first and second mold sections 36, 38, the injection rate, and the pressure within the mold cavity 40. Of course, mold cavity pressure clearly depends on the volume of the mold cavity 40. The blowing agent activates above a specific temperature, or pressure since the temperature and the pressure are related. If the temperature of the blowing agent is held below the activation temperature the blowing agent cannot activate. Once the temperature is above the activation temperature, the pressure of the mold cavity 40 determines the activation rate. For example, the greater the volume of the mold cavity 40 the lower the pressure and the more space available for the blowing agent to activate, thus allowing the blowing agent to create larger cells. In other words, the more active the blowing agent, the larger the cellular structure within the bottle closure 148 (FIG. 9), which in turn creates a low density area within the bottle closure 148. Conversely, reducing the volume of the mold cavity 40 increases the pressure and reduces the activation rate of the blowing agent, which reduces the cellular structure of the bottle closure 148 thereby creating a high density area within the bottle closure 148. Thus, through manipulation of the above-identified parameters the activation of the blowing agent within the injection mixture 46 is controlled to create the bottle closure 148 with a controlled cellular density distribution 100. Accordingly, the term cellular density is used throughout to refer not only to the number of cells within a given area, but also to the size of the cells in that given area. Thus, an area of low cellular density contains not only large cells but a small number of cells relative to the same sized area of high cellular density. The high cellular density area would contain more cells and smaller cells than the same sized area of low cellular density.

To control the temperature of injection mixture 46, as the injection mixture 46 enters the mold cavity 40 during injection, the central processing unit 74 controls several parameters. In the preferred embodiment, the central processing unit 74 receives feedback as to the injection temperature from a temperature sensor 126 near the nozzle inlet 44 (FIG. 1). The heater bin temperature is manipulated during the plasticization process and frictional heat is controlled during both the plasticization and back pressure cycles. Additionally, frictional heat developed from the injection mixture 46 moving through the injection nozzle during the injection process is controlled to provide the optimum amount of heat into the injection mixture 46.

The computer control program also controls the rate at which the injection mixture 46 is injected, during the injection cycle. Typically, a predetermined profile determines the rate at which the injection material 46 is to be injected during the injection cycle. A common profile specifies the required rate and maximum pressure set points to the variable vane pump supplying a profile of oil flow to the cylinders attached to the screw 60. A typical injection profile will begin at a slow injection rate with the pump set to allow for maximum pressure. As the mold cavity 40 fills, the rate proportionally increases to the optimum rate for the filling of the mold cavity 40. At some point during the filling of the mold cavity 40 the maximum pressure set point of the hydraulic pump 62 is lowered to a value which prevents the injection pressure from overcoming the clamp pressure. The remainder of the material is injected into the mold cavity 40 allowing the pressure compensation characteristics of the pump to control the rate at which the injection mixture 46 is injected.

The computer control program also controls the volume of the mold cavity by controlling the movement of the hydraulic piston 16, and by controlling the movement of the retractable mold portion 168. Through computer connections, the computer 74 manipulates the hydraulic piston 16, and therefore the movement of the mold carriage 26 and the attached second mold section 38. Additionally, the computer 74 manipulates the movement of the retractable mold portion 168. In this manner, the computer controls not only the formation of the mold cavity 40 but the volume of the mold cavity 40.

With regard to the formation of an bottle closure 148 with a cellular density distribution 100, the computer control program operates according to a predetermined control function. This control function depends on the volume of the mold cavity 40 and the injection rate of the injection mixture 46 into the mold cavity 40. FIG. 5 shows the general mathematical relationship between the cellular density of the bottle closure 148 and the volume of the mold cavity 40 as defined by the control function. The control function defines an inverse relationship between the cellular density and the volume of the mold cavity 40. In other words, the smaller the mold cavity 40 the smaller the cells created by the blowing agent, and therefore the more dense the cellular structure of the bottle closure 148. As the volume of the mold cavity 40 increases the pressure within the mold cavity 40 decreases. Presuming the pre-heating of the injection mixture 46 above the activation temperature of the blowing agent, this pressure drop allows for increased blowing agent activity. Increasing the volume of the mold cavity 40 creates room for the blowing agent to activate, thereby creating larger cells. This increased blowing agent activity creates a larger cellular structure within the bottle closure 148, and therefore a lower cellular density. The inverse relationship between the cellular density and the volume of the mold cavity 40 can take many forms, depending on the configuration of the molding apparatus. For example, the relationship might be linear, or represented by an N-degree polynomial, or exponential function. The inverse relationship between the cellular density and the volume of the mold cavity 40 can be expressed in terms of many other mathematical functions, just so long as the function defines an inverse relationship between the cellular density and the volume of the mold cavity 40.

Figure 6:
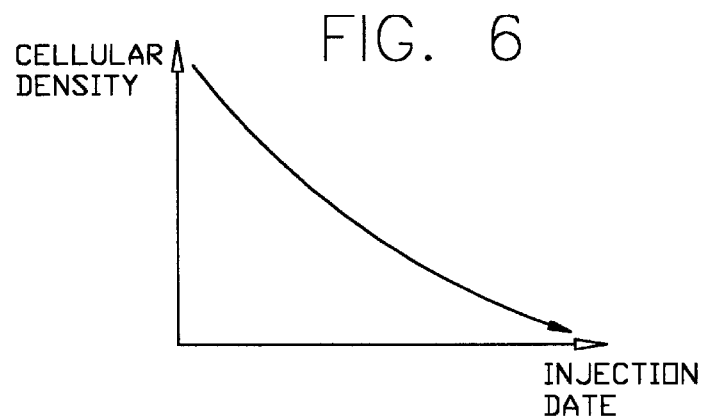
FIG. 6 is a graphical representation of the relationship between the cellular density and the injection rate.

FIG. 6 shows the mathematical relationship between the cellular density and the injection rate as defined by the control function. The control function defines an direct relationship between the cellular density and the injection rate. Presuming the pre-heating of the injection mixture 46 above the activation temperature of the blowing agent, a low injection rate reduces the amount of injection mixture 46 within the mold cavity 40, which creates space for the blowing agent within the injection mixture 46 to activate. This produces large cells and a low cellular density. Higher injection rates increase the amount of injection mixture 46 within the mold cavity 40 which correspondingly increases the pressure in the mold cavity 40. This reduces the space available for the blowing agent to activate, thereby reducing the cell size and increasing the density of the bottle closure 148. The direct relationship between the cellular density and the injection rate can take many forms, depending on the configuration of the molding apparatus. For example, the relationship might be linear, or represented by an N-degree polynomial, or exponential function. The inverse relationship between the cellular density and the injection rate can be expressed in terms of many other mathematical functions, just so long as the function defines an inverse relationship between the cellular density and the injection rate.

The following describes the sequence of events involved in creating the bottle closure 148 with the cellular density distribution 100. First, the injection mixture 46 is heated, through manipulation of the heater bin temperatures and the frictional heating during the injection process, to ensure that the injection mixture 46 enters the nozzle inlet 44 at a temperature above the activation temperature of the blowing agent. Then following formation of the mold cavity 40 the injection mixture 46 begins to enter the mold cavity 40 during a first molding period 108 (FIG. 2, FIG. 8).

Figure 8:
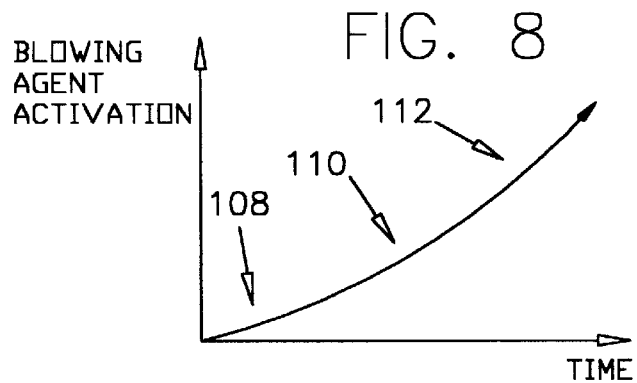
FIG. 8 is a graphical representation of the relationship between the blowing agent activation rate and the molding time.

FIG. 8 depicts the blowing agent activation rate versus molding time and shows that a first molding period 108 takes place at the beginning of the injection molding cycle. Additionally, the first molding period 108 represents the period in which the blowing agent begins to activate. During the first molding period 108 the control function of the computer control program, controls the volume of the mold cavity 40 and the injection rate to minimize the activity of the blowing agent. In this manner, the cellular density distribution 100 begins to form with the formation of a first cellular structure 102 (FIG. 2). The first cellular structure 102 is comprised of a high concentration of small cells. During this first molding period 108 the blowing agent activation rate is at a very low level (FIG. 8). By maintaining the mold cavity 40 at its smallest volume, and maintaining a relatively high injection rate, as shown in FIGS. 5–6, and FIG. 8, the blowing agent begins to activate. FIG. 2 shows that the first cellular structure 102 contains a high density arrangement of small cells. The reduced volume of the mold cavity 40 and the relatively high injection rate leaves little space in the mold cavity, thus the blowing agent forms only small cells. Consequently, during the first molding period 108 a first cellular structure 102 of the cellular density distribution 100 is formed at the exterior of the bottle closure 148. The first cellular structure 102 is comprised of a high density of small cells, formed during a period of low blowing agent activity. Thus, the first cellular structure 102 contains a point at which the cellular density within the bottle closure 148 reaches a maximum, and the cellular density within the first cellular structure 102 will vary from this point of maximum density to points of lower density.

Additionally, control of the temperatures of the molding surfaces 86, 88 can further effect the first cellular structure 102 of the cellular density distribution 100, formed during the first molding period 108. Controlling the temperature of the molding surfaces, for example with cooling means 124, allows the blowing agent in the injection mixture near the molding surfaces 86, 88 to cool to a temperature below the activation temperature. Thus, during the first molding period 108 when the activation rate of the blowing agent is already at its lowest level, the blowing agent in the injection mixture becomes permanently inactive when the outer portion of the bottle closure 148 cools below the activation temperature. In this manner, it is possible that during at least a portion of the first molding period 108 the blowing agent will not activate at all. This would produce a first cellular structure 102 of the cellular density distribution 100 in which at least a portion of the first cellular structure 102 contains no blowing agent activated cells. Thus, the bottle closure 148 contains a smooth dense outer skin.

Next, during a second molding period 110 the control function of the computer control program controls the volume of the mold cavity 40 and the injection rate to gradually increase the activation rate of the blowing agent (FIG. 8). By gradually expanding the volume of the mold cavity 40 and/or slowing the injection rate of the injection mixture 46 into the mold cavity 40, FIGS. 5–6 show that the cellular density decreases. In other words, the increase in the volume of the mold cavity 40 and the decrease in the injection rate both serve to reduce the pressure within the mold cavity 40. This creates space in the mold cavity 40 for the blowing agent to activate. A gradual increase in the available mold cavity space translates into a gradual increase in the activation rate of the blowing agent (FIG. 8). This in turn translates into a gradual transition from smaller cells to larger cells within the bottle closure 148 (FIG. 3). FIG. 3 shows the gradual transition between the high density first cellular structure 102 and the lower density transitional cellular structure 104. In this manner, during the second molding period 110 the transitional cellular structure 104 of the density distribution 100 forms in an area away from the exterior of the bottle closure 148.

Figure 7:
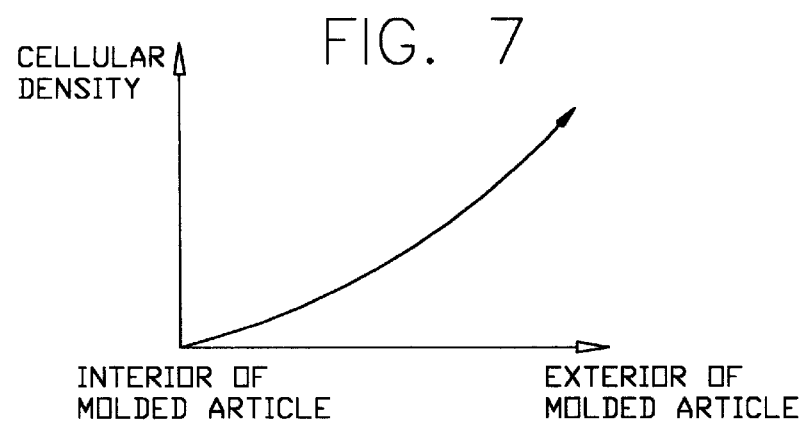
FIG. 7 is a graphical representation of the relationship between the cellular density and the cross-sectional area of the injection molded article

Next, during a third molding period 112 the control function of the computer control program controls the volume of the mold cavity 40 and the injection rate to form a second cellular structure 106 (FIGS. 4, 8). Again, by continuing to gradually expand the volume of the mold cavity 40, and/or by slowing the injection rate of the injection mixture 46 into the mold cavity 40, FIGS. 5–6 shows that the cellular density continues to decrease. During the third molding period 112 the activation rate of the blowing agent reaches a maximum value (FIG. 8). Thus, a second cellular structure 106 forms and contains a point at which the cellular density within the bottle closure 148 reaches a minimum, and the cellular density within the second cellular structure 106 will vary from this point of minimum density to points of higher density. Accordingly, the cell size of the cells formed during a third molding period 112 also reaches a maximum, and correspondingly the cellular density distribution 100 reaches a minimum density level (FIG. 4). In this manner, the bottle closure 148 contains a cellular density distribution 100 which varies gradually from a high density first cellular structure 102 located at the exterior of the bottle closure 148, to a relatively low density second cellular structure 106 located at the interior of the bottle closure 148 (FIG. 7). The cellular density distribution 100 also contains a transitional cellular structure 104 located between the first cellular structure 102 and the second cellular structure 106. The transitional cellular structure 104 gradually transitions between the high density first cellular structure 102 and the second cellular structure 106 of relatively lower density.

The gradual nature of the transition is determined by the control function of the computer control program. As mentioned hereinabove, the control function depends on the volume of the mold cavity 40 and the injection rate. Thus, the equation of the lines shown in FIGS. 5–6 must be capable of expression in the form of some continuous smooth function, as opposed to discrete functions like for example a step function. In order to produce the gradually varying cellular density distribution 100 the function that describe the behavior of the relationship between the cellular density, and the volume of the mold cavity 40 and/or the injection rate, when depicted graphically must produce a smooth unbroken continuous line (like those depicted in FIGS. 5–6). However, the exact slope and curvature can take many forms depending on the actual control function.

Furthermore, the bottle closure 148 tends to cool from the outside in. This means that the blowing agent in the injection material 46 located at the exterior of the bottle closure 148 cools below the activation temperature of the blowing agent, prior to the injection material 46 located at the center of the bottle closure 148. Thus, as the molding periods 108, 110, 112 progress the cellular structure becomes stable, and subsequent changes effected by the control function of the computer control program will not effect the already stabilized structures. In this manner, the control function of the computer control program operates to effect the activation rate of the blowing agent only in the molten injection mixture 46.

The bottle closure 148 of the present invention has the advantage of the look and feel of natural cork. The varying cellular structure of the bottle closure 148 allows the bottle closure 148 to compress varying amounts when the bottle closure 148 experiences varying amounts of pressure. The high density exterior will compress first and experiences minimal compression due to the small size of the cells, and as the pressure on the bottle closure 148 increases the low density interior begins to compress. The low density interior contains large cells and can, therefore, compress to a greater degree. Additionally, the bottle closure 148 returns to its original size once the compression pressure is removed. Thus, the bottle closure 148 of the present invention is ideally suited to perform the task of closing the neck of a bottle. The bottle closure 148 is compressible enough to be inserted into the neck of the bottle, and has a memory to return to its original position thereby sealing the neck of the bottle. The high density exterior promotes an air tight seal by eliminating gaps and voids that would allow the bottle contents to leak out or allow contaminants to enter the bottle.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, it is anticipated that the mold unit can be configured with more than one retractable mold portion thereby enabling the creation of several injection molded article at one time.

I claim:

1. An injection molded bottle closure with a gradually varying cellular structure thereby giving said bottle closure a compressibility and a memory for decompressibility and wherein said bottle closure is capable of removable engagement within an opening in a neck of a bottle thereby sealing said bottle, said bottle closure comprising:
   a) a first cellular structure of high density;
   b) a second cellular structure of relatively lower density; and
   c) a transitional cellular structure between said first cellular structure and said second cellular structure such that the cellular density of said bottle closure gradually decreases from said first cellular structure of high density to said second cellular structure of relatively lower density.

2. The bottle closure in accordance with claim 1 wherein said first cellular structure of high density is at a perimeter of said bottle closure.

3. The bottle closure in accordance with claim 2 wherein said second cellular structure of relatively lower density is at the center of said bottle closure.

4. The bottle closure of claim 1, wherein the first cellular structure surrounds the transitional cellular structure, and wherein the transitional cellular structure surrounds the second cellular structure.

5. The bottle closure of claim 1, wherein the bottle closure comprises a polymer.

6. The bottle closure of claim 1, wherein the bottle closure comprises ethylene vinylacetate.

7. The bottle closure of claim 1, wherein the first cellular structure comprises a first plurality of cells and wherein the second cellular structure comprises a second plurality of cells.

8. The bottle closure of claim 7, wherein the first plurality of cells comprises generally smaller cells than the second plurality of cells.

9. The bottle closure of claim 7, wherein the first plurality of cells comprises a generally higher concentration of cells than the second plurality of cells.

10. The bottle closure of claim 7, wherein each cell in the first plurality of cells and the second plurality of cells defines a gas filled void.

11. The bottle closure of claim 7, wherein an outer portion of the first cellular structure contains no cells.

12. The bottle closure of claim 1, wherein the bottle closure comprises a smooth outer surface.

13. A bottle closure for sealing a container, comprising:

a) a generally cylindrical core having a relatively low density cellular structure;

b) a skin having a relatively high density cellular structure that surrounds the core; and c) a transition zone, located between the generally cylindrical core and the skin, having a cellular structure that gradually decreases from a relatively high density near the skin to a relatively low density near the core.

14. The bottle closure of claim 13, wherein the bottle closure comprises a polymer.

15. The bottle closure of claim 13, wherein the bottle closure comprises ethylene vinylacetate.

16. The bottle closure of claim 13, wherein the skin defines a smooth outer surface.

17. The bottle closure of claim 13, wherein the bottle closure is adapted to return to its original size and shape after being compressed.

18. The bottle closure of claim 13, wherein the bottle closure is adapted for removal from and re-closure with a wine bottle.

19. The bottle closure of claim 13, wherein the bottle closure is formed by injection molding.

20. The bottle closure of claim 19, wherein the transition zone is formed by varying an injection rate and a mold cavity volume according to a predetermined control function.

* * * * *